United States Patent [19]

James

[11] Patent Number: 5,775,037
[45] Date of Patent: Jul. 7, 1998

[54] GROUND ANCHOR

[75] Inventor: Charles Simon James, Surrey, United Kingdom

[73] Assignee: Platipus Anchors Limited, Surrey, United Kingdom

[21] Appl. No.: 649,616

[22] PCT Filed: May 18, 1994

[86] PCT No.: PCT/GB94/01066

§ 371 Date: Aug. 6, 1996

§ 102(e) Date: Aug. 6, 1996

[87] PCT Pub. No.: WO95/12713

PCT Pub. Date: May 11, 1995

[30] Foreign Application Priority Data

Nov. 3, 1993 [GB] United Kingdom ............... 9322642

[51] Int. Cl.[6] .................................................. E02D 5/80
[52] U.S. Cl. .................. 52/163; 52/155; 52/166; 256/DIG. 5; 405/259.1
[58] Field of Search ..................... 52/155, 156, 159, 52/162, 163, 164, 165, 166, 204.591, 204.62, 204.7, 720.1, 741.11, 741.15, 780, DIG. 17; 256/21, 22, 59, DIG. 5; 405/253, 254, 259.1, 259.4, 259.5, 271

[56] References Cited

U.S. PATENT DOCUMENTS

| 610,184 | 9/1898 | Hill | 52/155 |
|---|---|---|---|
| 736,995 | 8/1903 | Miller | 52/163 |
| 994,356 | 6/1911 | Wood | 52/163 |
| 1,991,488 | 2/1935 | Blackburn | 52/159 |
| 3,139,163 | 6/1964 | Haller . | |
| 3,969,854 | 7/1976 | Deike | 52/163 |
| 4,574,539 | 3/1986 | Deike . | |
| 5,457,925 | 10/1995 | Koedyker | 52/506.06 |

FOREIGN PATENT DOCUMENTS 605389  1/1991  Australia .

*Primary Examiner*—Wynn E. Wood
*Assistant Examiner*—Kevin D. Wilkens
*Attorney, Agent, or Firm*—Brinks Hofer Gilson & Lione

[57] ABSTRACT

Ground anchors of the type which are attached to cables and rods and driven into the ground and tilted transversely by tensioning the cable. A ground anchor comprising a body portion having a generally triangular cross-section extending substantially along its length having generally concave sides and a continuous convex lower surface from one edge of the body portion where the sides and lower surface meet to an opposite edge.

10 Claims, 3 Drawing Sheets

GROUND ANCHOR

BACKGROUND OF THE INVENTION

The invention relates to ground anchors of the type which are attached to cables and rods and driven into the ground and tilted transversely by tensioning the cable.

A variety of ground anchors already exist including tubular anchors, such as those described in GB-A-1555580 and EP-A-0208153. These anchors are driven into the ground and then rotated to a horizontal locked position. As the surface area of these anchors is not particularly large, they are not appropriate for some uses where a particular degree of strength and resistance to removal from the ground is required.

Improvements have been made to such anchors which resulted in the addition of wings to provide a greater planar or surface area to resist the anchors from being pulled from the ground once in their tilted locked position. Examples of such wing anchors are known from EP-A-0313936, U.S. Pat. No. 4,574,539 and U.S. Pat. No. 3,282,002. Each of these anchors has different specific features which enable the anchors either to be easily driven into the ground, to prevent its withdrawal therefrom or to ease the ability to rotate the anchor once embedded in the ground.

However, in hard ground conditions wing-type anchors are not generally suitable because of the increase in the quantity of ground media to be moved. For such conditions high capacity small profile anchors, such as the original tubular anchors, are most suitable.

It is therefore an object of the present invention to further improve anchors of the small profile type in these respects.

SUMMARY OF THE INVENTION

According to the invention there is provided a ground anchor comprising a body portion having a generally triangular cross-section extending substantially along its length having generally concave sides and a continuous convex lower surface from one edge of the body portion where the sides and lower surface meet to an opposite edge.

Preferably the edges of said body portion curve or angle upwardly where the sides and lower surface meet. Edges of said body portion where the sides and lower surface meet are preferably rounded.

In a preferred embodiment of the invention the anchor comprises a driving edge formed at one end of said body portion.

Preferably the body portion extends upwardly to form a keel in which is formed an anchor eye. Alternatively a keel portion is formed on the body portion in which is formed a socket.

The keel member is preferably convergent in a horizontal and/or vertical plane from the eye portion or socket to the driving edge.

A preferred embodiment of the invention will now be described, by way of example only, with reference to the accompanying drawings.

DETAILED DESCRIPTION OF THE PREFERRED EMBODIMENTS

Figure 1:
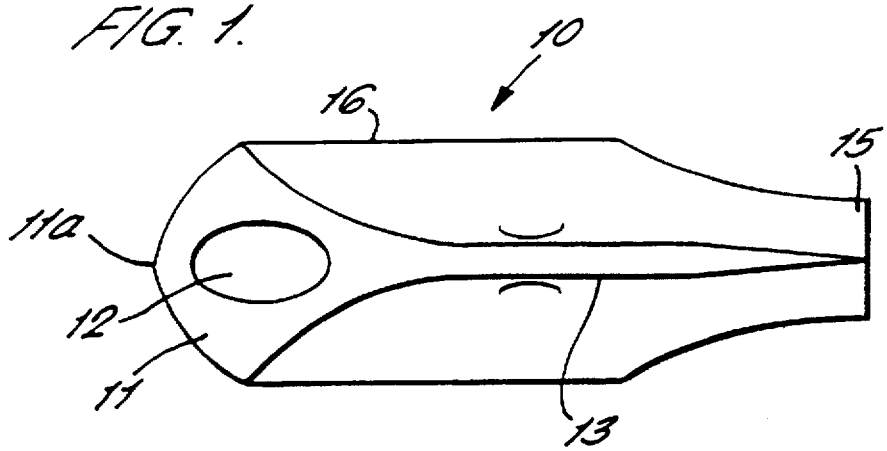
FIG. 1 is a plan view of an anchor according to the invention.
Figure 2:
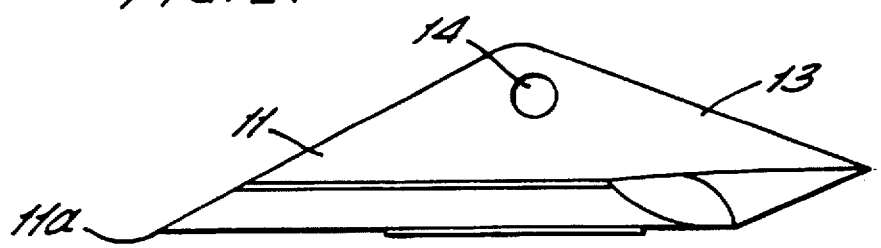
FIG. 2 is a side elevation of the anchor of FIG. 1.
Figure 3:
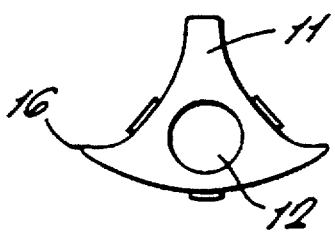
FIG. 3 is a front elevation of the anchor of FIG. 1.
Figure 4:
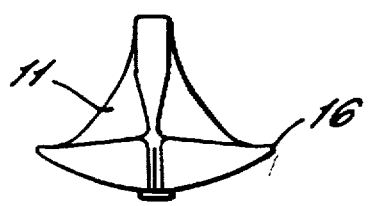
FIG. 4 is a rear elevation of the anchor of FIG. 1.

As shown in FIGS. 1–4 the anchor 10 comprises a generally triangular or bell-shaped body 11 having an axially extending blind bore 12 for receiving a driving tool. When viewed from one end, the anchor 10 is seen to have a triangular bell-shaped profile for a substantial length along its working surface. The sides of the anchor body 11 are, in profile, continuously concave from an upper edge of the working surface to edges 16 where the sides and lower surface meet. The lower surface of the body 11 is continuously convex from edge to edge. The edges 16, may curve or angle slightly upwardly from the horizontal. These edges 16 may be rounded or edge beads provided. It is to be noted that the use of the terms "concave" or "convex" are intended to include not only inwardly or outwardly rounded surfaces, but also surfaces which have flat regions which may be angled to other flat regions but which overall give an impression of concavity or convexity.

The body 11 extends upwardly to form a high keel 13 in which is formed an anchor eye 14 to which a cable may be attached. The high keel 13, which starts from the anchor eye 14, tapers downwardly towards a driving edge 15. The driving edge 15 may be sharpened to a chisel point. The keel 13 may also converge in the horizontal direction to form a point as it approaches the driving edge 15. The body portion 11 has a sharp tapering nose 11a at an end opposite to the driving edge 15.

Figure 5:
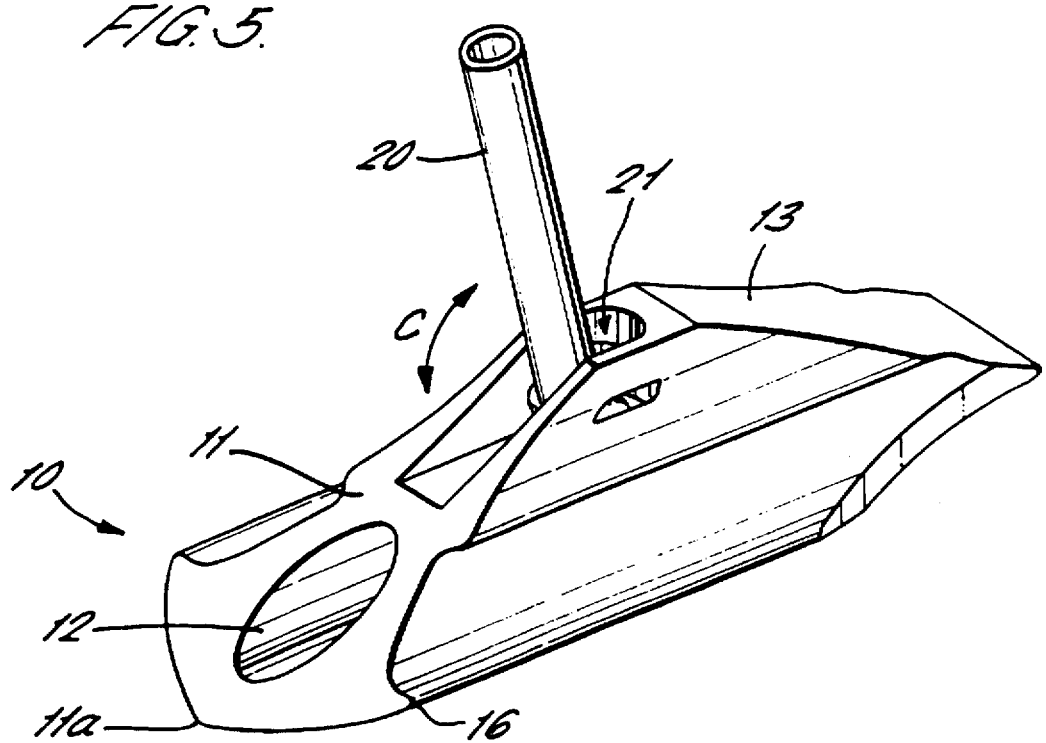
FIG. 5 is a schematic view of the anchor of FIG. 1 with the eye replaced with a swaged fitting.
Figure 6:
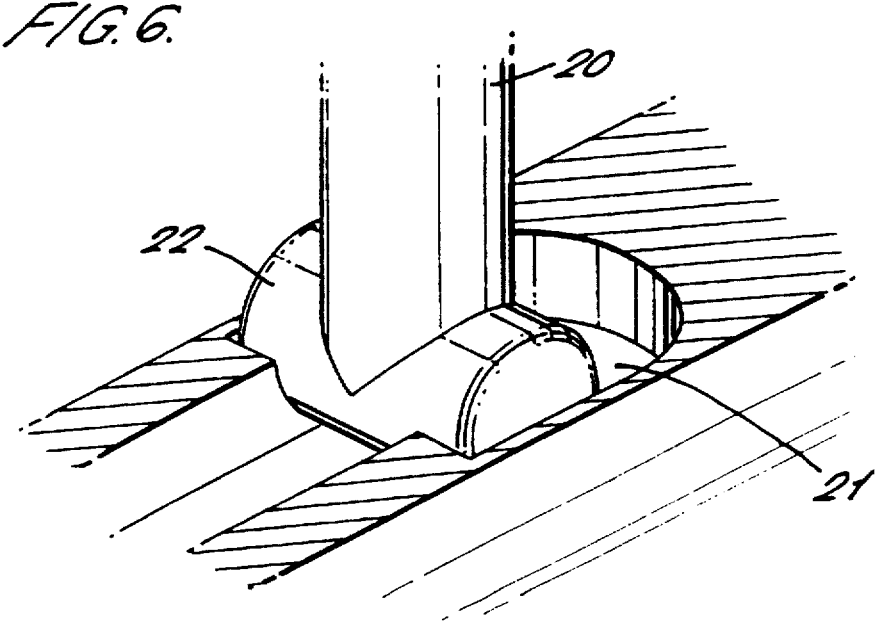
FIG. 6 is a partial schematic view of the swaged fitting of FIG. 5 with parts omitted for clarity.

In an alternative embodiment of the invention, as shown in FIGS. 5 and 6, the eye 14 is replaced with a T-shaped swaged fitting 20. The fitting 20 is inserted into a socket 21 formed in the keel 13 with the cross bar 22 positioned longitudinally to the body 11. The fitting 20 can then be rotated through 90° to the position shown in FIGS. 5 and 6 whereby the T-piece 22 is anchored in the socket 21 under the keel 13. The fitting 20 can then pivot in the direction of the arrow C.

In this embodiment of the invention, the working surface of the anchor extends to below the keel 13.

Figure 7C:
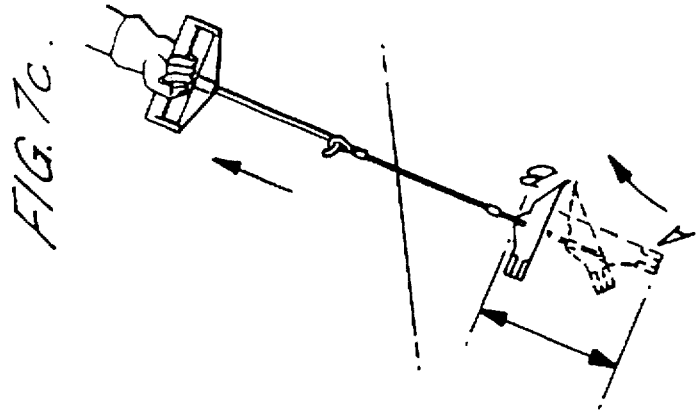
FIGS. 7a–7c are schematic views of the installion steps applied to a prior art anchor.
Figure 7B:
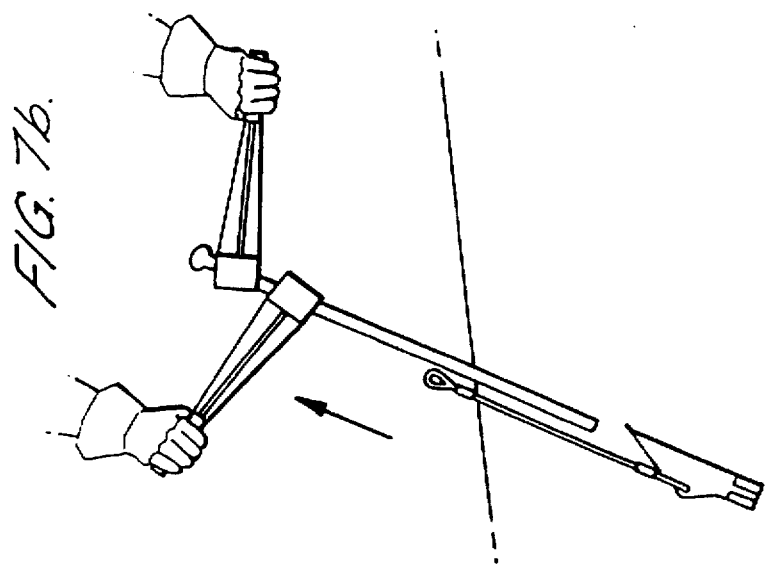
Figure 7A:
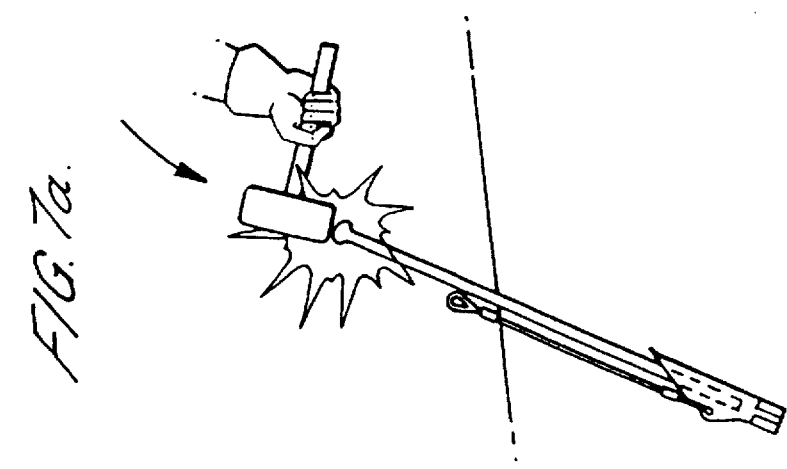

In use, a cable or rod is attached to the eye portion 14 or swaged fitting 20 and a driving rod is inserted into the bore 12. The anchor 10 is driven into the ground, driving edge 15 first to its installed position, by applying a force to the driving rod. FIG. 7a illustrates the installed position of a prior art anchor.

The driving edge 15 splits the ground media by way of separating the upper side and lower side and compresses the media out of the way. This enhances the ability of the anchor 10 to drive more quickly and easily through harder media. The high keel 13 further enhances significantly the ability of the anchor 10 to drive straight through difficult anchoring media.

Once the anchor 10 has reached its desired depth, the drive rod is removed from the bore 12. A pulling force is applied to the cable or rod which causes the anchor 10 to rotate in the ground to a generally horizontal load locked position (see FIG. 7A–B). Once the sharp nose 11a of the body 11 bites the back of the hole into which the anchor 10 is driven, this forms a fulcrum for the anchor 10 to turn about. The upwardly curved edges 16 of the anchor body 11 help to consolidate the turn of the anchor 10.

The triangular or bell-shaped working surface area of the anchor 10 offers a significant increase in potential load over traditional tube-style anchors whilst the anchor remains a small profile anchor which is necessary for hard ground conditions. The shaped surface offers high load possibilities for a small surface area anchor by focusing the frustrum of soil more clearly.

The rounded edges 16 of the anchor 10 further enhance the frustum area and reduce spill-off during high loadings and therefore reduce mechanical shear.

The anchor 10 may be made from any suitable material depending on its required use, such as iron/steel, copper and brass based alloys, aluminium, non-ferous materials and possibly non-metallic materials.

I claim:

1. A ground anchor comprising a body portion having a generally triangular cross-section extending substantially along a length thereof and having generally concave sides and a lower surface, said lower surface and said concave sides meeting to form a first edge and a second edge, wherein said lower surface is continuously convex between said first and second edges.

2. An anchor as claimed in claim 1 in which said first edge and said second edge curve upwardly from a horizontal plane.

3. An anchor as claimed in claim 2 wherein said first and second edges are rounded.

4. An anchor as claimed in claim 3 further comprising a driving edge formed at an end of said body portion.

5. An anchor as claimed in claim 4 wherein said body portion extends upwardly to form a keel having an anchor eye.

6. An anchor as claimed in claim 5 wherein said keel member tapers downwardly to said driving edge.

7. An anchor as claimed in claim 6 wherein said keel member is convergent to the horizontal plane.

8. An anchor as claimed in claim 4 wherein said body portion includes a keel member having a socket.

9. An anchor as claimed in claim 8 wherein said keel member tapers downwardly to said driving edge.

10. An anchor as claimed in claim 9 wherein said keel member is convergent to the horizontal plane.

* * * * *

UNITED STATES PATENT AND TRADEMARK OFFICE
CERTIFICATE OF CORRECTION

PATENT NO.   : 5,775,037
DATED        : July 7, 1998
INVENTOR(S)  : Charles S. James Agg It is certified that error appears in the above-identified patent and that said Letters Patent is hereby corrected as shown below:

On the Title Page

In column 1, item [75], please change "Charles Simon James," to --Charles Simon James Agg,--.

Signed and Sealed this

Twenty-fourth Day of April, 2001

Attest:

NICHOLAS P. GODICI

Attesting Officer

Acting Director of the United States Patent and Trademark Office